United States Patent [19]
Huskin

[11] 3,808,708
[45] May 7, 1974

[54] MATHEMATICAL INSTRUCTION GAME

[76] Inventor: Elizabeth J. Huskin, P.O. Box 186, Chadds Ford, Pa.

[22] Filed: Oct. 20, 1972

[21] Appl. No.: 299,421

[52] U.S. Cl. .................................. 35/31 D, 35/73
[51] Int. Cl. ........................................... G09b 19/02
[58] Field of Search ...... 35/31 R, 31 C, 31 D, 31 E, 35/31 F, 31 G, 30, 32, 70, 72, 73

[56] References Cited
UNITED STATES PATENTS

| | | | |
|---|---|---|---|
| 2,839,844 | 6/1958 | Lehnkering | 35/70 |
| 140,722 | 7/1873 | Muldaur | 35/71 |
| 3,402,482 | 9/1968 | Rankin | 35/31 E |
| 1,174,689 | 3/1916 | Coleman | 35/32 X |
| 692,019 | 1/1902 | Kolshorn | 35/32 X |
| 3,224,114 | 12/1965 | Swanson | 35/70 X |

FOREIGN PATENTS OR APPLICATIONS

| | | | |
|---|---|---|---|
| 9,816 | 0/1898 | Great Britain | 35/73 |

*Primary Examiner*—Wm. H. Grieb
*Attorney, Agent, or Firm*—Maleson, Kimmelman & Ratner; Nelson E. Kimmelman

[57] ABSTRACT

A playing board of wood or other appropriate material contains a number of parallel rows of cubicles. There are a plurality of cubes having on some faces problems in the multiplication or division tables and on opposed faces answers to those respective problems. The players may select a certain number of cubes and then try to arrange the problem and answer cubes of a particular number in their proper tabular positions in adjacent rows of cubicles. Sliding board pieces contain answers to the problems to enable the player to check his answers. Other sliding pieces contain indicia representative of fractions or elementary slide rule markings to teach its basic operation.

8 Claims, 13 Drawing Figures

PATENTED MAY 7 1974 3,808,708
SHEET 1 OF 2
FIG. 1
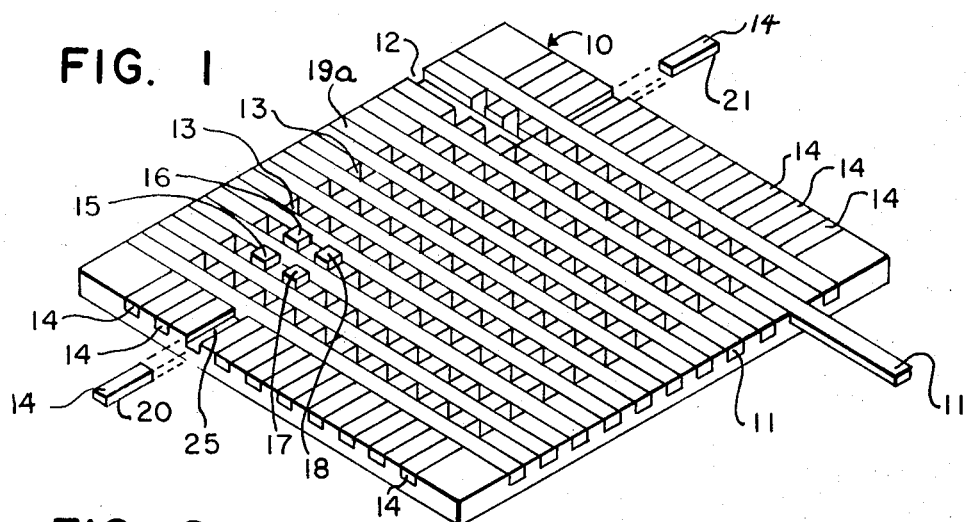
FIG. 2
| 1'S | 2'S | 3'S | 4'S | 5'S |
|---|---|---|---|---|
| 9 | 18 | 27 | 36 | 45 |
FIG. 3
| 6'S | 7'S | 8'S | 9'S | 10'S |
|---|---|---|---|---|
| 54 | 63 | 72 | 81 | 90 |
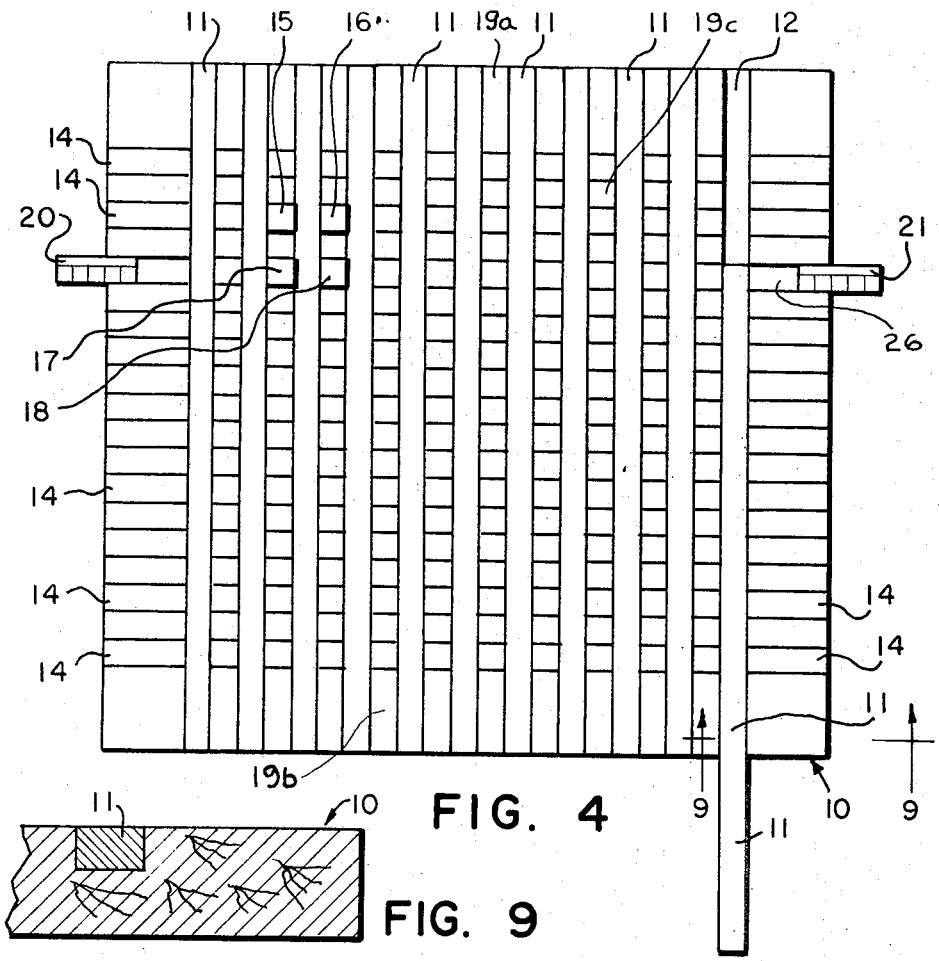
FIG. 4
FIG. 9

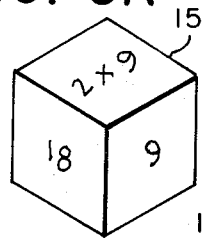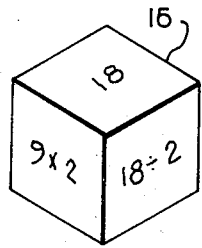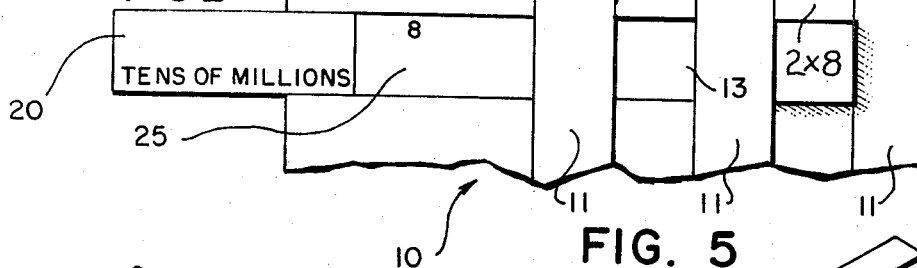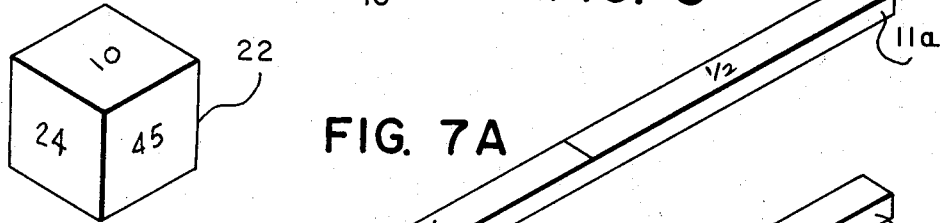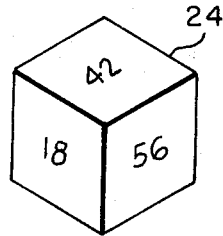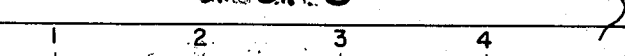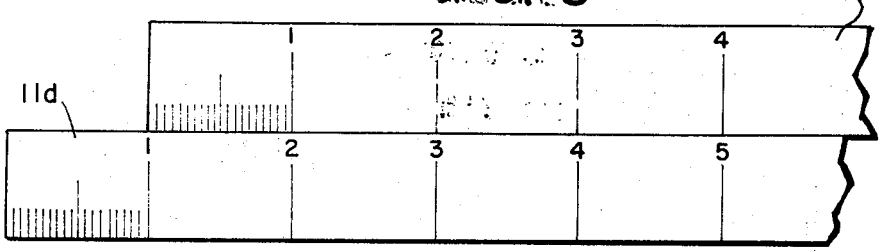

MATHEMATICAL INSTRUCTION GAME

BACKGROUND OF THE INVENTION

1. Field of the Invention

This invention relates to game board instructional apparatus and more particularly to apparatus for promoting the learning of mathematical principles.

2. Prior Art

There are a number of apparatuses which use cubes having numerical indicia thereupon for teaching mathematical principles. Some cubes have numbers on their faces, others have operation or equal signs on their faces while still others have answers on their faces but the cubes are not used in conjunction with a board. Other games use boards having products printed in rows and employing cubes representing multipliers and multiplicands. No game is known in which a board is used for correct placement of cubes containing on certain faces problems and on others (opposing) answers to those problems.

SUMMARY OF THE INVENTION

A playing board having a plurality of rows of recesses (cubicles) and a plurality of sets of playing pieces which fit into the recesses and which have mathematical problems on some faces and answers on others.

BRIEF DESCRIPTION OF THE DRAWINGS

FIG. 1 is a perspective view of the playing board in accordance with the present invention showing several playing pieces in position thereupon;

FIGS. 2 and 3 are enlargements of bottom views of portions of the board shown in FIG. 1;

FIG. 4 is a plan view of the board shown in FIG. 1 with several playing pieces inserted and with several portions inverted;

FIG. 5 is an enlargement of a portion of the board shown in FIG. 4 with several parts moved to show additional markings;

FIGS. 6A and 6B are enlarged perspective views of several cubes shown in FIGS. 1 and 4;

FIGS. 6C and 6D are enlarged perspective views of other cubes used in a different embodiment of the present invention;

FIGS. 7A and 7B are inverted perspective views of different embodiments of portions of the board shown in FIGS. 1-4; and FIG. 8 is an enlarged fragmentary view, in plan, of still another embodiment of portions of the board shown in FIGS. 1 and 4.

FIG. 9 is a fragmentary, sectional, enlarged view of a portion of the apparatus shown in FIG. 4 taken along section line 9—9 in the direction indicated.

DETAILED DESCRIPTION OF THE DRAWINGS

FIGS. 1-6B illustrate one embodiment of the present invention. An essentially square board 10 is made of wood, plastic or other appropriate material. There are a plurality of parallel elongated members 11 which fit snugly into channels 12 as shown and slide downwards from the top or upwards from the bottom. Any two adjacent ones of members 12 provide side walls for a row of cubicles 13. The other walls of the cubicles 13 are formed by the upwardly-projecting portions 19 of the board such as the upper and lower end portions 19a and 19b of each row of cubicles and the intermediate upward projections 19c. There are also, in the embodiment of FIG. 1, a plurality of slideable pieces 14 which slide within grooves 25 and 26 on the left and right sides of the board. Two of said pieces are shown moved out of their respective channels 25 and 26 in FIG. 1 and their under-sides are shown enlarged in FIGS. 2 and 3 respectively.

There are any desired number of cubicles arranged in each row from the top to the bottom of the board 10. Each row may have, for example, 10 cubicles as shown, representing 0 to 9 in multiplication tables, for example. If 0 to 12 were desired, each row would have 13 cubicles. The rows could also be used to represent division tables. Ten rows of cubicles are shown representing, for example, the tables of 1's through 10's or 0's through 9's. Of course, any additional number of rows may be used to include higher numbers than 10.

For each of the multiplication tables there are provided twenty cubes of the type shown in FIGS. 6A and 6B. Thus, for a board having 10 rows of cubicles, there would be 200 cubes.

One type of game for which this playing board is well-suited employs a structure such as a shaker for a dice into which two complete sets of cubes are placed. By a set of cubes is meant all cubes, which pose problems of multiplication or division involving any selected number from 1 to 10 and also set forth answers to the problems. Cubes 15 and 16 are examples from the set of cubes involving the 2's table. The other set could, for example, be all of the cubes involving 7's. When both sets of cubes are tumbled about in the shaker and then spilled out onto a level surface, player A will then take any six cubes of the 2's set and player B any six cubes of the 7's set. Player A will then attempt to position selected cubes having upper-faces representing problems (e.g., 2 × 9, 2 × 8) in the proper corresponding cubicles in any selected row. He will also attempt to position cubes having the correct answers to those problems in cubicles in the next row, opposite the problem-posing cubes. For example, if player A positions cube 15 within the ninth cubicle from the bottom of the board as shown in the second row of cubicles from the left, he will also seek to place cube 16 having the corresponding answer "18" next to the cube 15 as shown in the adjacent row of cubes. He will also, for example, place cube 17 as shown in the cubicle in the same row just below cube 15 and insert cube 18 with answer "16" into the adjacent cubicle in the next row just below cube 16.

Meanwhile, player B will be attempting to put his cubes containing problems and answers involving the 7's table in appropriate cubicles in other rows such as seventh and eighth rows from the left of the board in the same manner. After each player has inserted his six cubes in their proper cubicles, the remaining cubes of the two sets are again put into the shaker, tumbled again and then spilled out onto a level surface whereupon the same procedure is repeated. Whichever of the two (or more) players first completes filling his two rows of cubicles correctly is declared the winner.

Of course a number of variations may be introduced if desired. Fewer than the entire set of cubes may be inserted into the shaker in the initial throw. More or less than six cubes may be selected by each player at each throw. Instead of putting into the shaker only cubes such as cubes 15, 16, 17 and 18, "bonus" cubes such as cubes 22 and 24 may also be mixed in. These cubes do not have problems on any faces, just answers.

In multiplication, the players can put into any cubicle the proper cube for that cubicle no matter what the order of multiplier-multiplicand is, i.e., 2 × 9 or 9 × 2 and then must place the proper product cube in the adjacent cubicle. This helps to teach the commutative principle.

The board may also be used to teach the division tables in similar fashion, using the same cubes such as cubes 15 and 16 or other ones containing only division indicia thereupon.

If a player wishes to check the accuracy of his placement of cubes 15 and 16, for example, he can slide out piece 14 in the horizontal (left-to-right) channel 25, turn it over and check the indicia. In FIG. 2 the under side of piece 14 is shown with the product answers to the problems 1 × 9, 2 × 9, 3 × 9, 4 × 9 and 5 × 9 respectively. These correspond to the products of the 1's through 5's tables when the multiplier is 9 and to the correct answers for the five cubicles in the left-to-right row in which cubes 15 and 16 are positioned. The indicia 21 on the underside of piece 14 in channel 26 correspond to the products of the 6's through 10's tables when the multiplier is 9. Of course, if desired, all of the answers to a table such as the 2's table could be printed in the bottom of the channel 12 (not shown) below the sliding member 11 located next-adjacent the row in which cubes 15 and 17 appear. Alternatively, they could be printed on the back of that member 11 (not shown).

The members 11 could also be used to illustrate fractions if either the top or bottom surface bore markings as shown on members 11a and 11b in FIGS. 7A and 7B. The concept and spatial relation of fractions are graphically shown and the remaining fractions up to 1/10's could be contained on the next eight ones of the members 11.

FIG. 8 depicts another use to which the elongated members could be put. Two of the members 11c and 11d could have simplified, non-logarithmic slide rule indicia to teach the basic operation of the slide rule.

To teach the relationship of the place in which members appear, the upper faces of the slidable pieces 14 could bear printed indicia running from units, tens, hundreds, thousands, etc. to billions as shown in FIG. 5. The board 10 would be turned counter-clockwise 90° so that these so-labelled members 14 would be arrayed at the bottom edge. Then player A would put say three cubes bearing only single digits into the shaker, shake them, spell them out and then place them in a left-to-right row of cubicles in places which will give the maximum value. Player B would do the same in his turn and this would be repeated by each player twice more. Players could reposition their cubes after each throw to increase the collective value of the upper surfaces of their cubes. After three throws apiece and repositioning of the cubes, the aggregate numbers of the players would be compared to determine the winner. If player A had $$978, 421, 046$$

and player B had $$954, 321, 210$$

player A would be declared the winner.

Many other ways of using the device as illustrated will undoubtedly occur to one who reads this specification. These variations are embraced within the basic concept of my invention and I therefore desire that its scope be determined by the claims which follow.

What is claimed is:

1. An educational device comprising:
   a. a playing board having a plurality of substantially parallel rows of cubicles extending in a first direction, said cubicles having walls thereof defined by a plurality of fixed members spaced from one another and arranged in rows extending in said first direction and also having the other walls thereof defined by a plurality of slidable strips disposed within the spaces between said fixed members and extending in a second direction perpendicular to said first direction, said strips bearing mathematical indicia thereupon, and
   b. a plurality of sets of cube-like playing pieces adapted to fit in said cubicles having mathematical problem indicia on selected faces thereof and answer indicia on selected other faces thereof.

2. The educational device according to claim 1 wherein said slidable strips bear fractional indicia.

3. The educational device according to claim 1 wherein said slidable strips bear numerical indicia useful in teaching the principles of the slide rule.

4. The educational device according to claim 1 wherein the answer indicia on said faces on said cubes are disposed on faces of said cubes opposite said problem indicia.

5. The educational device according to claim 1 wherein said plurality of sets of cubes correspond to a plurality of mathematical multiplication tables.

6. The educational device according to claim 1 wherein said plurality of sets of cubes correspond to a plurality of division tables.

7. The educational device according to claim 1 wherein said board has a predetermined number of additional slidable pieces on opposing sides of said board in alignment with said rows of cubicles, said additional slidable pieces bearing predetermined indicia thereupon relating to mathematical subject matter.

8. The educational device according to claim 7 wherein said additional slidable pieces contain answers to mathematical problems corresponding to problems on cubes intended to fit in the row of cubicles aligned therewith.

* * * * *